J. W. MOFFAT.
PROCESS OF TREATING METALLIC OXIDS.
APPLICATION FILED APR. 30, 1918.
1,294,514.
Patented Feb. 18, 1919.
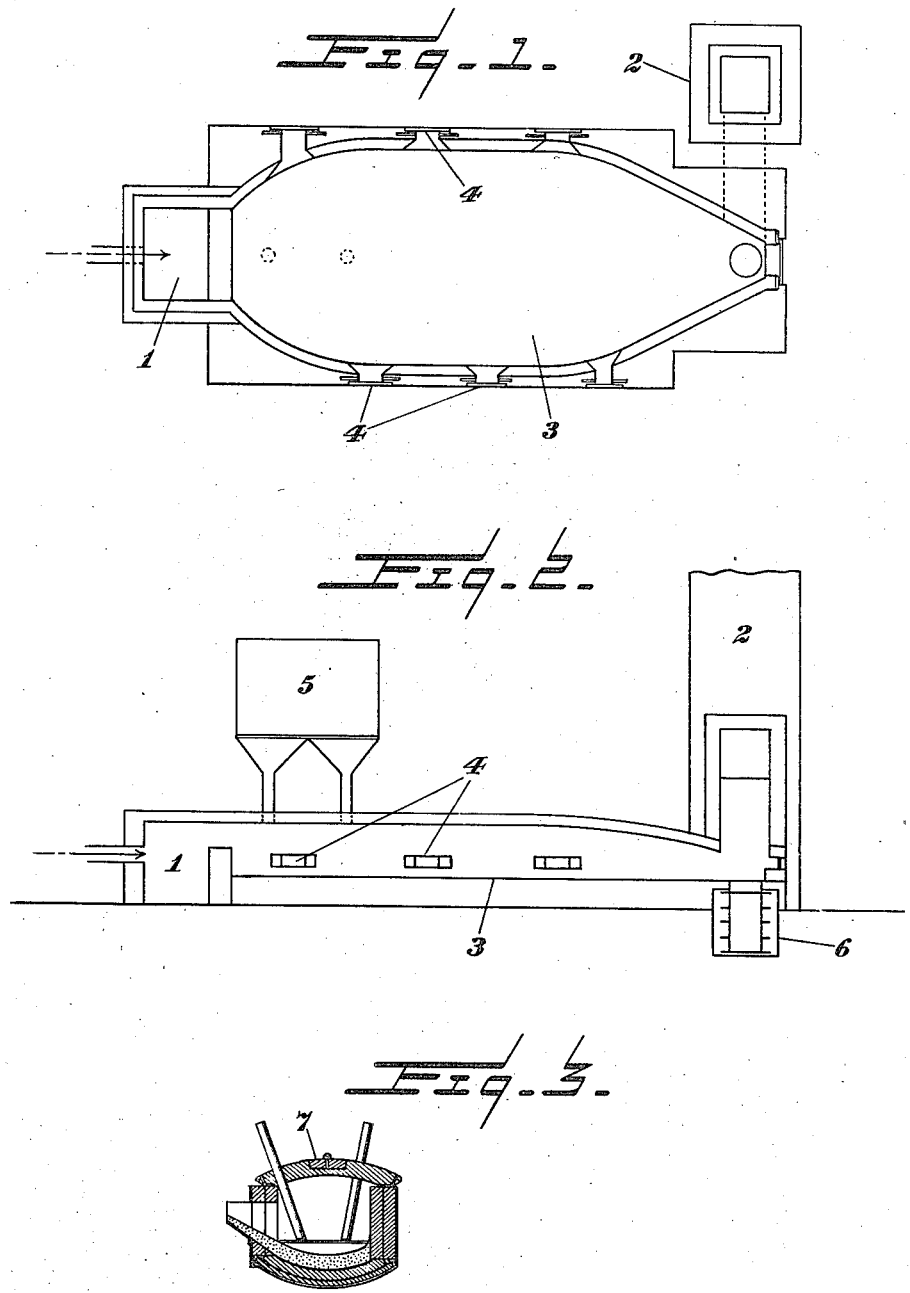

UNITED STATES PATENT OFFICE.

JAMES W. MOFFAT, OF TORONTO, ONTARIO, CANADA.

PROCESS OF TREATING METALLIC OXIDS.

1,294,514.  Specification of Letters Patent.  Patented Feb. 18, 1919.

Application filed April 30, 1918. Serial No. 231,672.

*To all whom it may concern:*

Be it known that I, JAMES WILLIAM MOFFAT, of the city of Toronto, in the county of York, Province of Ontario, Canada, have invented a certain new and useful Improvement in Processes of Treating Metallic Oxids, of which the following is a specification.

This invention relates to the production of metals from their oxids and more particularly to the production of iron and steel or their alloys, from their natural oxids or from roasted sulfid ores and my object is to devise a process in which the reduction of the ore and the melting of the de-oxidized material are conducted in separate operations so that the de-oxidation can be carried on at the lowest possible temperature and the use of high temperatures confined to the melting operation, thus effecting marked economies in the consumption of fuel or electrical energy. In carrying out my process the oxid ore is substantially reduced by the action of carbon monoxid or solid carbon, the temperature being controlled carefully so that it is just sufficient to effect reduction without fusion of the metal, whereby the metal is obtained in a discrete condition or in a condition in which it is easily broken up or crumbled.

The precise method of reducing the ore without fusion forms no part of the present invention and any known method may be employed.

Care must be taken after the ore is reduced to maintain it in an inert or reducing atmosphere until it is either cooled below the temperature of re-oxidation, approximately 350° to 700° cent., or until it has been fused as hereinafter described.

The reducing apparatus may be located in any convenient position relative to the electric furnace and the reduced ore maintained out of contact with the atmosphere until fed into the electric furnace, which may be of the arc type and which, when in use, is substantially sealed or closed.

In this furnace the reduced ore is fused, a reducing atmosphere being maintained therein in any suitable manner as by introducing carbon with the charge. There will also be introduced into the furnace any flux that may be needed or any other materials necessary to give the final product any desired characteristics.

In case of iron ores the reduction will usually be effected without the employment of a flux and any flux needed will be added to the charge in the electric furnace. Any of the ordinary iron ores capable of being reduced without fusion may be treated in this way, and also ores consisting partly of iron such as chromite.

The advantages of the process are numerous. Ore of any grade of fineness may be handled with ease which is not the case in processes in which reduction and fusion take place in the same furnace. I prefer to use the unreduced ore in a fine state of division as it is much more easily reduced in that condition when reduced without fusion. After reduction it is still desirable to have the material in a granular condition as it is much more easily handled and charged into the electric furnace.

Ordinarily it is not feasible to divide the operations of reducing and fusing owing to the readiness with which the unfused and reduced material re-oxidizes, but by using an electric furnace of the arc type I insure a strongly reducing atmosphere over the charge, as even if there were no surplus of carbon in the charge to maintain a reducing atmosphere any free oxygen acts on the carbon of the electrodes, and at the temperature of the electric furnace, carbon monoxid is produced as long as sufficient carbon is present. The process also is very economical even when the reduced ore is cooled below 350° C. before it is charged into the electric furnace as the ore is reduced more economically at the low temperatures employed in the first part of the process than at the high temperatures of the electric furnace.

By reducing iron ores before they reach the electric furnace the injurious effect of iron oxids on the linings of the electric furnace is almost entirely avoided. The capacity of an electric furnace is also greatly increased as the time any given quantity of metal remains in the furnace is much reduced. The additional cost of the reducing furnace is small as compared with an electric furnace so that the capital expenditure for a given capacity is much less than for an all-electric plant.

While I do not desire to restrict myself to any particular form of apparatus, I illustrate suitable apparatus more or less diagrammatically in the accompanying sheet of drawings in which—

Figure 1 is a horizontal section of a reducing furnace;

Fig. 2 a vertical section of the same; and
Fig. 3 a vertical section of a suitable electric furnace.

In the drawings like numerals of reference indicate corresponding parts in the different figures.

The reducing furnace is of the reverberatory type and is provided at one end with the combustion chamber 1 and at the other end with the chimney 2 connected by suitable flues with the interior of the furnace. At each side above the bed 3 of the furnace are formed poker holes 4, which will be provided with ordinary slides or closures. Ore bins 5 are provided above the furnace from which the ore is fed by suitable spouts to the bed of the furnace. The ore will be hand rabbled and gradually worked to the chimney end of the furnace, and finally raked through a suitable opening into a movable receptacle 6. When the receptacle is filled it may be removed and covered in any suitable manner, or powdered coke or charcoal may be spread over the top of the charge to exclude the atmosphere. After removal, the receptacle is carried to the electric furnace and the ore contained therein dumped into the furnace through an opening in the top, which is normally closed by a stopper 7. At the same time any suitable flux or alloy materials are added. This furnace, it will be seen, is of an ordinary type, preferably adapted to tilt and may be of the specific construction shown in my co-pending application No. 227277 filed April 8th, 1918.

What I claim as my invention is:—

1. A discontinuous process of treating metallic oxid ores which consists in reducing a charge of ore without fusion in a suitable furnace, and after reducing, excluding oxidizing gases from contact with the charge while its temperature is above the lower limit at which re-oxidation can take place, placing the reduced charge in a separate electric furnace and fusing it therein in an inert or reducing atmosphere.

2. A discontinuous process of treating metallic oxid ores which consists in reducing a charge of granular ore without fusion in a suitable furnace and at as low a temperature as possible to maintain the granular form of the reduced ore, and after reducing, excluding oxidizing gases from contact with the charge while its temperature is above the lower limit at which re-oxidation can take place, placing the reduced charge in a separate electric furnace and fusing it therein in an inert or reducing atmosphere.

3. A discontinuous process of treating metallic oxid ores which consists in reducing a charge of ore without a flux without fusion in a suitable furnace, and after reducing, excluding oxidizing gases from contact with the charge while its temperature is above the lower limit at which re-oxidation can take place, placing the reduced charge in a separate electric furnace and fusing it therein with a flux in an inert or reducing atmosphere.

4. In the process set forth in claim 1, cooling the charge after reduction and before fusion to a temperature below that at which re-oxidation can take place (approximately 350° cent.).

5. In the process set forth in claim 2, cooling the charge after reduction and before fusion to a temperature below that at which re-oxidation can take place (approximately 350° cent.).

6. In the process set forth in claim 3, cooling the charge after reduction and before fusion to a temperature below that at which re-oxidation can take place (approximately 350° cent.).

Signed at Toronto, Canada, this 27th day of April, 1918.

JAMES W. MOFFAT.